United States Patent
Hinokimori

(10) Patent No.: US 8,883,959 B2
(45) Date of Patent: Nov. 11, 2014

(54) METHOD FOR MANUFACTURING POLYARYLENE SULFIDE RESIN

(71) Applicant: DIC Corporation, Tokyo (JP)

(72) Inventor: Toshio Hinokimori, Ichihara (JP)

(73) Assignee: DIC Corporation, Tokyo (JP)

( * ) Notice: Subject to any disclaimer, the term of this patent is extended or adjusted under 35 U.S.C. 154(b) by 0 days.

(21) Appl. No.: 14/151,086

(22) Filed: Jan. 9, 2014

(65) Prior Publication Data

US 2014/0128568 A1 May 8, 2014

Related U.S. Application Data

(62) Division of application No. 13/130,097, filed as application No. PCT/JP2009/069082 on Nov. 10, 2009.

(30) Foreign Application Priority Data

Nov. 21, 2008 (JP) ................................ 2008-297941

(51) Int. Cl.
*C08G 75/14* (2006.01)
*C08G 75/02* (2006.01)
*C08G 75/16* (2006.01)

(52) U.S. Cl.
CPC ............ *C08G 75/16* (2013.01); *C08G 75/0254* (2013.01)
USPC ............ 528/388; 528/488; 528/489; 528/499

(58) Field of Classification Search
USPC .................. 528/388, 488, 489, 499
See application file for complete search history.

(56) References Cited

U.S. PATENT DOCUMENTS

| 2010/0228003 A1* | 9/2010 | Hinokimori et al. .......... 528/388 |
| 2010/0240863 A1* | 9/2010 | Hinokimori et al. .......... 528/388 |

FOREIGN PATENT DOCUMENTS

| JP | 01-153727 | 6/1989 |
| JP | 04-145127 | 5/1992 |
| JP | 08-231723 | 9/1996 |
| JP | 2004-182910 A | 7/2004 |
| JP | 2006-225639 A | 8/2006 |
| WO | WO-2006/068159 A1 | 6/2006 |

OTHER PUBLICATIONS

International Search Report dated Feb. 9, 2010, issued for PCT/JP2009/069082.

* cited by examiner

*Primary Examiner* — Shane Fang
(74) *Attorney, Agent, or Firm* — Edwards Wildman Palmer LLP

(57) ABSTRACT

A method for producing a polyarylene sulfide resin, comprising: producing a slurry (I) containing a solid alkali metal sulfide by allowing a hydrous alkali metal sulfide, or a hydrous alkali metal hydrosulfide and an alkali metal hydroxide, and an aliphatic cyclic compound (c1) that can be ring-opened by hydrolysis to react with each other while conducting dehydration in the presence of a non-hydrolyzable organic solvent; adding an aprotic polar organic solvent after the production of the slurry (I) and distilling off water to conduct dehydration; and conducting polymerization by allowing a polyhaloaromatic compound (a), an alkali metal hydrosulfide (b), and an alkali metal salt (c2) of a hydrolysate of the compound (c1) to react with each other in the slurry (I) in a state where the amount of water existing in the reaction system is 0.02 moles or less relative to 1 mole of the aprotic polar organic solvent.

6 Claims, No Drawings

METHOD FOR MANUFACTURING POLYARYLENE SULFIDE RESIN

This application is a divisional application of U.S. application Ser. No. 13/130,097 filed May 19, 2011 which claims the right of priority under 35 U.S.C. §119 based on Japanese Patent Application No. 2008-297941 filed Nov. 21, 2008.

TECHNICAL FIELD

The present invention relates to a method for producing a linear, high-molecular-weight polyarylene sulfide resin with high efficiency.

BACKGROUND ART

Polyarylene sulfide resins (hereinafter abbreviated to "PAS resins") typified by polyphenylene sulfide resins (hereinafter abbreviated to "PPS resins") have good heat resistance and chemical resistance, and are widely used for applications such as electric/electronic components, automobile parts, water heater components, fibers, and films. In these applications, recently, high-molecular-weight PAS resins have been particularly widely used in terms of high strength and good moldability. However, a high-molecular-weight PAS resin is usually produced by synthesizing a low-molecular-weight PAS resin, and then subjecting the PAS resin to thermal oxidative cross-linking so as to increase the molecular weight. Accordingly, the resulting high-molecular-weight PAS resin is difficult to be subjected to melt-extrusion molding, and the application thereof has been limited.

Consequently, as a method for producing such a linear, high-molecular-weight PAS resin, for example, the following method is known: A hydrous alkali metal sulfide, N-methylpyrrolidone, the amount of which is less than 1 mole per mole of the hydrous alkali metal sulfide, and a polyhaloaromatic compound are mixed, the resulting mixture is dehydrated by azeotropy to thereby obtain a composition containing a particulate anhydrous alkali metal sulfide in the form of a slurry, and the slurry is then polymerized by heating to produce a linear, high-molecular-weight PAS resin with high production efficiency (refer to, for example, PTL 1).

The aforementioned method can suppress side reactions and efficiently produce a linear, high-molecular-weight PAS resin. However, since the polymerization is conducted by a heterogeneous reaction in which the starting materials are allowed to react with each other in the form of a slurry, a slight amount of water such as crystal water remaining in the reaction system induces side reactions, and the molecular weight of the resin does not reach the recently desired high level.

In addition, the following method for producing a PAS resin has been proposed: In producing a PAS resin by allowing an alkali metal sulfide to react with a dihaloaromatic compound in an organic amide solvent by heating, polymerization is conducted by using an anhydrous alkali metal sulfide having a purity of 95% or more and containing an alkali metal hydrosulfide in an amount of 2% by mass or less, and by adding water in an amount of 0.1 to 0.8 moles per mole of the alkali metal sulfide so as to control a charging concentration of the alkali metal sulfide to be 2.5 to 5 mole/L (refer to, for example, PTL 2).

However, in the aforementioned method for producing a PAS resin using an anhydrous alkali metal sulfide, since the anhydrous alkali metal sulfide is a solid, the polymerization reaction does not proceed if no additional treatment is performed. Therefore, it is necessary to dissolve the solid anhydrous alkali metal sulfide and to supply the alkali metal sulfide as a sulfiding agent to the reaction system. In PTL 2, water is added so as to accelerate the dissolution of the solid anhydrous alkali metal sulfide. However, this water induces side reactions, resulting in a problem of difficulty in achieving a high molecular weight.

CITATION LIST

Patent Literature

PTL 1: Japanese Unexamined Patent Application Publication No. 8-231723
PTL 2: Japanese Unexamined Patent Application Publication No. 4-145127

SUMMARY OF INVENTION

Technical Problem

Accordingly, a problem to be solved by the present invention is to provide a method for producing a polyarylene sulfide resin with which high productivity is achieved on an industrial scale, and the molecular weight of the resulting PAS resin can be significantly increased.

Solution to Problem

In order to solve the above problem, the inventors of the present invention have conducted intensive studies. As a result, it was found that, in producing a polyarylene sulfide resin by a reaction of a polyhaloaromatic compound, an alkali metal hydrosulfide, and an organic acid alkali metal salt, the molecular weight of the PAS resin can be increased more than ever before by conducting the reaction in the presence of a solid alkali metal sulfide and an aprotic polar organic solvent while controlling the amount of the organic acid alkali metal salt to be a certain range relative to the amount of sulfur atoms present in the reaction system, i.e., relative to the total number of moles of the solid alkali metal sulfide and the alkali metal hydrosulfide, and controlling the amount of water existing in the reaction system to be a certain amount of less. This finding resulted in the completion of the present invention.

Specifically, the present invention provides a method for producing a polyarylene sulfide resin including allowing a polyhaloaromatic compound (a), an alkali metal hydrosulfide (b), and an organic acid alkali metal salt (c) to react with each other in the presence of a solid alkali metal sulfide and an aprotic polar organic solvent, in which the reaction is conducted using the organic acid alkali metal salt (c) in a ratio of 0.01 moles or more and less than 0.9 moles relative to a total of 1 mole of the solid alkali metal sulfide and the alkali metal hydrosulfide (b) in a state where the amount of water existing in the reaction system is 0.02 moles or less relative to 1 mole of the aprotic polar organic solvent.

Advantageous Effects of Invention

According to the present invention, it is possible to provide a method for producing a polyarylene sulfide resin with which high productivity is achieved on an industrial scale, and the molecular weight of the resulting PAS resin can be significantly increased.

DESCRIPTION OF EMBODIMENTS

A method for producing a polyarylene sulfide resin of the present invention is a method for producing a polyarylene sulfide resin including allowing a polyhaloaromatic compound (a), an alkali metal hydrosulfide (b), and an organic acid alkali metal salt (c) to react with each other in the presence of a solid alkali metal sulfide and an aprotic polar organic solvent, in which the reaction is conducted using the organic acid alkali metal salt (c) a ratio of 0.01 moles or more and less than 0.9 moles relative to a total of 1 mole of the solid alkali metal sulfide and the alkali metal hydrosulfide (b) in a state where the amount of water existing in the reaction system is 0.02 moles or less relative to 1 mole of the aprotic polar organic solvent.

In this manner, in a reaction of a polyhaloaromatic compound (a), an alkali metal hydrosulfide (b), and an organic acid alkali metal salt (c) in the presence of a solid alkali metal sulfide and an aprotic polar organic solvent, the reaction is conducted while controlling the amount of the organic acid alkali metal salt (c) to be 0.01 moles or more and less than 0.9 moles relative to the amount of sulfur atoms present in the reaction system, i.e., relative to a total of 1 mole of the solid alkali metal sulfide and the alkali metal hydrosulfide (b) in a state where the amount of water in the reaction system is reduced as much as possible. Thus, a heterogeneous reaction is conducted using a sulfiding agent in a solid form. Consequently, side reactions can be suppressed and thus a PAS resin having a higher molecular weight can be produced. Note that "the amount of water existing in the reaction system" refers to, out of the total amount of water in the reaction system, a total amount of water that is actually present as crystal water, $H_2O$, or the like in the reaction system.

As described above, the existing ratio of the organic acid alkali metal salt (c) in the reaction system is 0.01 moles or more and less than 0.9 moles, and particularly preferably in the range of 0.04 to 0.4 moles relative to 1 mole of sulfur atoms present in the reaction system from the standpoint that a significant effect of suppressing side reactions can be achieved.

Herein, specific examples of the organic acid alkali metal salt (c) include alkali metal salts of a lower fatty acid such as formic acid, acetic acid, or propionic acid; alkali metal salts of an aminocarboxylic acid such as glycine, alanine, glutamic acid, or 4-aminobutyric acid; and alkali metal salts of hydrolysates of aliphatic cyclic compounds which can be ring-opened by hydrolysis, such as aliphatic cyclic amide compounds, e.g., N-methyl-2-pyrrolidone (hereinafter abbreviated to "NMP"), N-cyclohexyl-2-pyrrolidone, 2-pyrrolidone, 1,3-dimethyl-2-imidazolidinone, ε-caprolactam, and N-methyl-ε-caprolactam, and sulfolanes, e.g., sulfolane and dimethylsulfolane. Examples of the alkali metal salt include a lithium salt, a sodium salt, a potassium salt, a rubidium salt, and a cesium salt. It is preferable that the organic acid alkali metal salt (c) be used in the form of a liquid in the reaction system.

Among these organic acid alkali metal salts (c), an alkali metal salt (c2) of a hydrolysate of an aliphatic cyclic compound (c1) is preferable in terms of good reactivity, and an alkali metal salt of a ring-opened product of an aliphatic cyclic amide compound, particularly an alkali metal salt of a hydrolysate of N-methyl-2-pyrrolidone is preferable in terms of reactivity. In addition, these alkali metal salts are preferably used as a lithium salt or a sodium salt, and particularly preferably as a sodium salt.

Examples of the aprotic polar organic solvent include amides, ureas, and lactams such as NMP, N-cyclohexyl-2-pyrrolidone, N-methyl-ε-caprolactam, formamide, acetamide, N-methylformamide, N,N-dimethylacetamide, 2-pyrrolidone, ε-caprolactam, hexamethylphosphoramide, tetramethylurea, N-dimethylpropyleneurea, 1,3-dimethyl-2-imidazolidinone; sulfolanes such as sulfolane and dimethylsulfolane; nitriles such as benzonitrile; ketones such as methyl phenyl ketone; and mixtures thereof. Among these aprotic polar organic solvents, NMP is particularly preferable from the standpoint of improving reactivity of a sulfiding agent.

In the method for producing a polyarylene sulfide resin of the present invention, it is necessary to reduce the amount of water existing in the reaction system as much as possible, specifically, to 0.02 moles or less relative to 1 mole of the aprotic polar organic solvent. A more specific production process is a method including the following steps 1 to 3.

The method for producing a polyarylene sulfide resin includes, as essential production steps, step 1:
a step of producing a slurry (I) containing a solid alkali metal sulfide by allowing a hydrous alkali metal sulfide, or a hydrous alkali metal hydrosulfide and an alkali metal hydroxide, and an aliphatic cyclic compound (c1) that can be ring-opened by hydrolysis to react with each other while conducting dehydration in the presence of a non-hydrolyzable organic solvent;

step 2: a step of further adding an aprotic polar organic solvent after the production of the slurry (I), and distilling off water to conduct dehydration; and step 3: a step of conducting polymerization by allowing a polyhaloaromatic compound (a), an alkali metal hydrosulfide (b), and an alkali metal salt (c2) of a hydrolysate of the compound (c1) to react with each other in the slurry (I) obtained through the dehydration step of step 2 in a state where the amount of water existing in the reaction system is 0.02 moles or less relative to 1 mole of the aprotic polar organic solvent.

Steps 1 to 3 above will now be described in detail.

Step 1 is a step of producing a slurry (I) by allowing a hydrous alkali metal sulfide, or a hydrous alkali metal hydrosulfide and an alkali metal hydroxide, an aliphatic cyclic compound (c1) that can be ring-opened by hydrolysis, and a non-hydrolyzable organic solvent to react with each other while conducting dehydration.

Thus, step 1 is a step of forming a slurry (I) in which a solid alkali metal sulfide is dispersed in a non-hydrolyzable organic solvent by allowing a hydrous alkali metal sulfide and an aliphatic cyclic compound (c1) that can be ring-opened by hydrolysis to react with each other while conducting dehydration in the presence of the non-hydrolyzable organic solvent; or a step of forming a slurry (I) in which a solid alkali metal sulfide is dispersed in a non-hydrolyzable organic solvent by allowing a hydrous alkali metal hydrosulfide and an alkali metal hydroxide and an aliphatic cyclic compound (c1) that can be ring-opened by hydrolysis to react with each other while conducting dehydration in the presence of the non-hydrolyzable organic solvent. In the slurry (I), an alkali metal hydrosulfide (b) and an alkali metal salt (c2) of a hydrolysate of the compound (c1) coexist.

Examples of the hydrous alkali metal sulfide used herein include liquid or solid hydrates of compounds such as lithium sulfide, sodium sulfide, potassium sulfide, rubidium sulfide, and cesium sulfide. The solid content thereof is preferably 10% to 80% by mass, and particularly preferably 35% to 65% by mass.

Among these, hydrates of sodium sulfide are preferable in view of reactivity. When the hydrous alkali metal sulfide is used as a sulfur source, it is preferable to further add an alkali metal hydroxide besides the hydrous alkali metal sulfide and to conduct the dehydration treatment from the standpoint of further accelerating the production of the solid alkali metal sulfide.

Examples of the hydrous alkali metal hydrosulfide include liquid or solid hydrates of compounds such as lithium hydrosulfide, sodium hydrosulfide, potassium hydrosulfide, rubidium hydrosulfide, and cesium hydrosulfide. The solid content thereof is preferably 10% to 80% by mass. Among these, hydrates of lithium hydrosulfide and hydrates of sodium hydrosulfide are preferable, and hydrates of sodium hydrosulfide are particularly preferable.

Examples of the alkali metal hydroxide include lithium hydroxide, sodium hydroxide, potassium hydroxide, rubidium hydroxide, cesium hydroxide, and aqueous solutions thereof. When the aqueous solution is used, an aqueous solution having a concentration of 20% by mass or more is preferable from the standpoint of the ease of the dehydration treatment in step 1. Among these, lithium hydroxide, sodium hydroxide, and potassium hydroxide are preferable, and sodium hydroxide is particularly preferable. The amount of alkali metal hydroxide used is preferably 0.8 to 1.2 moles, and particularly preferably 0.9 to 1.1 moles per mole of the alkali metal hydrosulfide (b) from the standpoint of accelerating the production of the solid alkali metal sulfide.

More specifically, examples of the method for conducting the dehydration treatment in step 1 include the following methods.

(Method 1-A)

A method includes charging predetermined amounts of an aliphatic cyclic compound (c1) that can be ring-opened by hydrolysis, a non-hydrolyzable organic solvent, a hydrous alkali metal sulfide, and if necessary, the alkali metal hydrosulfide or the alkali metal hydroxide in a reaction vessel; and dehydrating by heating the reaction solution to a temperature which is equal to or higher than the boiling point of the hydrous alkali metal sulfide and also enables removal of water through azeotropy, specifically, in the range of 80° C. to 220° C., and preferably in the range of 100° C. to 200° C.

(Method 1-B)

A method includes charging predetermined amounts of an aliphatic cyclic compound (c1) that can be ring-opened by hydrolysis, a non-hydrolyzable organic solvent, a hydrous alkali metal hydrosulfide, and an alkali metal hydroxide in a reaction vessel; producing a hydrous alkali metal sulfide substantially simultaneously with this charging; and then dehydrating by heating the reaction solution to a temperature which is equal to or higher than the boiling point of the hydrous alkali metal sulfide and also enables removal of water through azeotropy, specifically, in the range of 80° C. to 220° C., and preferably in the range of 100° C. to 200° C.

In methods 1-A and 1-B, water and a non-hydrolyzable organic solvent, which have been removed by azeotropic distillation, are separated by a decanter, and then only the non-hydrolyzable organic solvent may be returned to the reaction system, or the non-hydrolyzable organic solvent may be additionally charged in an amount equivalent to the amount removed by azeotropic distillation, or the non-hydrolyzable organic solvent may be excessively charged in advance in an amount equal to or more than that removed by azeotropic distillation. In the present invention, method 1-B is particularly preferable from the standpoint that the slurry is easily prepared and significant effects of the present invention can be achieved.

At the initial stage of the dehydration, the reaction system is composed of two layers of an organic layer and an aqueous layer. As the dehydration proceeds, an anhydrous alkali metal sulfide is precipitated in the form of fine particles and is uniformly dispersed in the non-hydrolyzable organic solvent. Furthermore, the dehydration treatment is continuously performed until almost all the aliphatic cyclic compound (c1) that can be ring-opened by hydrolysis in the reaction system is hydrolyzed by hydrolysis.

Thus, step 1 of the present invention is a step in which water is discharged out of the reaction system by a dehydration treatment, the compound (c1) that can be ring-opened by hydrolysis is hydrolyzed, and an anhydrous solid alkali metal sulfide is precipitated at the same time. Therefore, when an excessive amount of water is present in the reaction system after the dehydration treatment, a large amount of by-products are produced in a subsequent polymerization step, thereby inducing a propagating-end termination reaction, and thus the production of the target PAS resin having a higher molecular weight tends to be inhibited.

Therefore, it is preferable that the total amount of water in the reaction system is as low as possible after the dehydration treatment in step 1. Specifically, the amount of water is preferably more than 0.1 moles and 0.99 moles or less, and more preferably 0.6 to 0.96 moles per mole of the hydrous alkali metal sulfide (method 1-A) or the hydrous alkali metal hydrosulfide (method 1-B) used in step 1, i.e., per mole of sulfur atoms in the reaction system. Herein, the term "total amount of water in the reaction system" refers to a total mass of water consumed in the hydrolysis of the compound (c1), a slight amount of crystal water remaining in the solid alkali metal sulfide, and all other water components present in the reaction system.

Furthermore, with regard to the amount of water in the reaction system after the dehydration treatment in step 1, the above-described total amount of water is preferably more than 0.1 moles and 0.99 moles or less, and particularly preferably 0.6 to 0.96 moles per mole of sulfur atoms in the reaction system, and the amount of water existing in the reaction system is preferably 0.03 to 0.11 moles per mole of sulfur atoms in the reaction system. Herein, "the amount of water existing in the reaction system" refers to, out of the total amount of water in the reaction system, a total amount of water except for the water consumed in the hydrolysis of the compound (c1), that is, a total amount of water that is actually present as crystal water, $H_2O$, or the like in the reaction system (hereinafter, these are referred to as "crystal water and the like").

Here, the reaction in step 1 can be represented by, for example, formula (1) below. In other words, step 1 is a step of removing, out of the reaction system, water to be produced as a by-product during producing the solid alkali metal sulfide, also hydrolyzing the aliphatic cyclic compound (c1), and forming an alkali metal hydrosulfide (b) at the same time.

Step 1: Dehydration reaction

[Chem. 1]

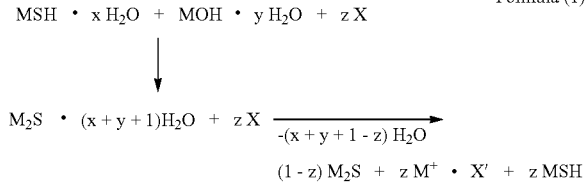

Formula (1)

In formula (1) above, x and y represent numbers that satisfy an equation of (x+y)=0.1 to 30, z represents a number of 0.01 or more and less than 0.9, M represents an alkali metal atom, X represents the compound (c1), and X' represents a hydrolysate of X.

By adjusting the amount of aliphatic cyclic compound (c1) charged in step 1, it is possible to adjust the amount of alkali metal sulfide, which is a solid component in the reaction system, and the amount of alkali metal hydrosulfide (b). The present invention is characterized by allowing the alkali metal sulfide to be present in a solid form in the slurry, allowing residual crystal water to be extracted in the solution by further adding an aprotic polar organic solvent in step 2 to conduct a dehydration treatment, and performing a heterogeneous reaction in the slurry state in step 3, thereby reducing the amount of the alkali metal salt of the hydrolysate of the aliphatic cyclic compound (c1), suppressing side reactions during polymerization of the PAS resin, and enabling the molecular weight to be increased. Therefore, the amount of the aliphatic cyclic compound (c1) charged in step 1 is preferably 0.01 moles or more and less than 0.9 moles per mole of the hydrous alkali metal sulfide (method 1-A) or the hydrous alkali metal hydrosulfide (method 1-B). In particular, the aliphatic cyclic compound (c1) is preferably used in an amount of 0.04 to 0.4 moles per mole of the hydrous alkali metal sulfide (method 1-A) or the hydrous alkali metal hydrosulfide (method 1-B) from the standpoint that the above advantages are significantly achieved.

Herein, as the aprotic polar organic solvent used in step 2, the same aprotic polar organic solvents as those described above can be used.

Examples of the alkali metal salts of a hydrolysate of the aliphatic cyclic compound (c1) include a lithium salt, a sodium salt, a potassium salt, a rubidium salt, and a cesium salt of a hydrolysate of the aliphatic cyclic compound (c1). These organic acid alkali metal salts (c) is preferably in a liquid state in the reaction system.

Among the above organic acid alkali metal salts (c), an alkali metal salt (c2) of a hydrolysate of the aliphatic cyclic compound (c1) is preferable in terms of good reactivity, and an alkali metal salt of a ring-opened product of an aliphatic cyclic amide compound, in particular, an alkali metal salt of a hydrolysate of NMP is preferable in terms of reactivity. In addition, these alkali metal salts are preferably used as a lithium salt or a sodium salt.

The non-hydrolyzable organic solvent used in step 1 may be any organic solvent as long as the organic solvent is inert to water, as described above. For example, versatile aliphatic hydrocarbons, aromatic hydrocarbons, and the like can be used. In the present invention, the polyhaloaromatic compound (a), which is subjected to the reaction in step 3, is particularly preferably used as the organic solvent from the standpoint that the reaction and polymerization in subsequent step 3 are satisfactorily conducted, and thus production efficiency can be markedly improved.

Examples of the polyhaloaromatic compound (a) used herein include p-dihalobenzenes, m-dihalobenzenes, o-dihalobenzenes, 1,2,3-trihalobenzenes, 1,2,4-trihalobenzenes, 1,3,5-trihalobenzenes, 1,2,3,5-tetrahalobenzenes, 1,2,4,5-tetrahalobenzenes, 1,4,6-trihalonaphthalenes, 2,5-dihalotoluenes, 1,4-dihalonaphthalenes, 1-methoxy-2,5-dihalobenzenes, 4,4'-dihalobiphenyls, 3,5-dihalobenzoic acids, 2,4-dihalobenzoic acids, 2,5-dihalonitrobenzenes, 2,4-dihalonitrobenzenes, 2,4-dihaloanisoles, p,p'-dihalodiphenyl ethers, 4,4'-dihalobenzophenones, 4,4'-dihalodiphenylsulfones, 4,4'-dihalodiphenyl sulfoxides, 4,4'-dihalodiphenyl sulfides, and compounds having an alkyl group of 1 to 18 carbon atoms as a nuclear substituent on the aromatic ring of any of the compounds. Furthermore, the halogen atom contained in each of the above compounds is preferably a chlorine atom or a bromine atom.

Among the above polyhaloaromatic compounds (a), difunctional dihaloaromatic compounds are preferable from the standpoint that a linear, high-molecular-weight PAS resin can be efficiently produced in the present invention. Among these, p-dichlorobenzene, m-dichlorobenzene, 4,4'-dichlorobenzophenone, and 4,4'-dichlorodiphenylsulfone are preferable from the standpoint that the PAS resin obtained finally has good mechanical strength and moldability, and p-dichlorobenzene is particularly preferable. In order to produce a linear PAS resin with a polymer structure having a partially branched structure, it is preferable to use a 1,2,3-trihalobenzene, 1,2,4-trihalobenzene, or 1,3,5-trihalobenzene partially in combination with the above dihaloaromatic compound.

The amount of non-hydrolyzable organic solvent used is not particularly limited, but is preferably determined so that fluidity of the slurry (I) obtained in step 1 is satisfactory. When the polyhaloaromatic compound (a) is used as the non-hydrolyzable organic solvent, the amount of non-hydrolyzable organic solvent is preferably in the range of 0.2 to 5.0 moles, and particularly preferably in the range of 0.3 to 2.0 moles relative to 1 mole, of the hydrous alkali metal sulfide (method 1-A) or the hydrous alkali metal hydrosulfide (method 1-B) from the standpoint that the reactivity and polymerizability in step 2 are good. The polyhaloaromatic compound (a) can be used without further treatment in the subsequent step in the production of the PAS resin, and may be optionally added in the subsequent step in the production of the PAS resin when the amount is insufficient, while the compound may be removed when the amount is excessive.

It is also possible to obtain a copolymer containing two or more types of different reaction units by selecting a proper combination of the polyhaloaromatic compounds (a). For example, p-dichlorobenzene and 4,4'-dichlorobenzophenone or 4,4'-dichlorodiphenylsulfone are particularly preferably used in combination because a polyarylene sulfide having good heat resistance is obtained.

Next, step 2 is a step of further adding an aprotic polar organic solvent to the slurry (I) obtained in step 1, and distilling off water to conduct dehydration until the amount of water existing in the reaction system is reduced to 0.02 moles or less relative to 1 mole of the aprotic polar organic solvent present in the reaction system at the start of step 3. The water distilled off in step 2 is crystal water and the like that have not been completely removed in step 1. Similarly to that described above, "the amount of water existing in the reaction system" refers to the amount of water and the like that are actually present in the reaction system. As described above, at the time of the completion of step 1, crystal water and the like are usually contained in the slurry (I) in an amount of 0.03 to 0.11 moles per mole of sulfur atoms in the reaction system. The dehydration step of step 2 is performed in order to reduce the amount of crystal water and the like in the reaction system as much as possible.

If water such as crystal water exists in the reaction system in step 3, the solid alkali metal sulfide dissociates into an alkali metal hydrosulfide and an alkali metal hydroxide, resulting in a problem of inducing a phenol-producing propagating-end termination reaction caused by a side reaction between the alkali metal hydroxide and the polyhaloaromatic compound (a) or a side reaction between the alkali metal hydroxide and a halogen of a polymer terminal group (refer to formula (2) below). In addition, in step 2, when the aliphatic cyclic compound (c1) that can be ring-opened by hydrolysis is additionally added as the aprotic polar organic solvent, although a hydrolysis reaction of the aliphatic cyclic compound (c1) also occurs in parallel by the water existing in the reaction system, the above phenol-producing propagating-end termination reaction, which is a competitive reaction, preferentially occurs. Consequently, the production of the target PAS resin having a higher molecular weight tends to be inhibited.

[Chem. 2]

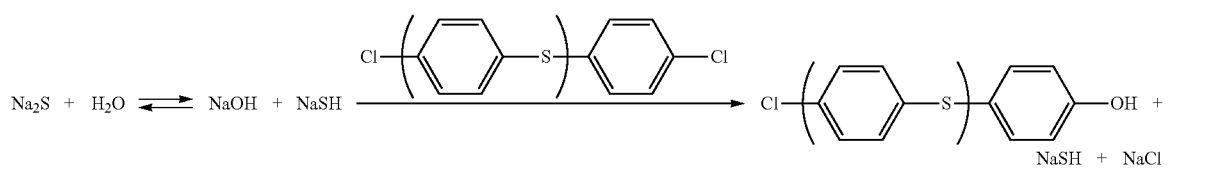

Formula (2)

In the present invention, by adding an aprotic polar organic solvent in step 2, crystal water that is not completely removed in step 1 and remains in the reaction system is extracted in the solution, and the crystal water and the like can be reduced as much as possible by the subsequent dehydration treatment. A reaction is conducted in a state where the amount of water existing in the reaction system at the start of step 3 is 0.02 moles or less relative to 1 mole of the aprotic polar organic solvent present in the reaction system, thereby suppressing a phenol-producing propagating-end termination reaction caused by a side reaction between an alkali metal hydroxide and the polyhaloaromatic compound (a) or a side reaction between an alkali metal hydroxide and a halogen of a polymer terminal group and obtaining a high-molecular-weight resin.

The dehydration treatment of step 2 is specifically performed as follows. After the slurry (I) is formed in step 1, more preferably, after the amount of crystal water and the like present in the slurry (I) becomes 0.03 to 0.11 moles per mole of sulfur atoms in the reaction system, as step 2, an aprotic polar organic solvent is added to the reaction system and dehydration is conducted. In this step, the amount of aprotic polar organic solvent added is preferably in a ratio of 0.5 to 5 moles relative to 1 mole of sulfur atoms present in the reaction system from the standpoint that the residual crystal water and the like can be efficiently extracted in the solution by adding the aprotic polar organic solvent. The dehydration treatment in step 2 is usually conducted under the conditions of a temperature of 180° C. to 220° C. and a gauge pressure of 0.0 to 0.1 MPa, and preferably under the conditions of a temperature of 180° C. to 200° C. and a gauge pressure of 0.0 to 0.05 MPa from the standpoint that the dehydration efficiency is high and the occurrence of side reactions that inhibit polymerization can be suppressed. Specifically, a method is employed in which a mixture of an aprotic polar organic solvent and water is isolated by distillation under the conditions of the above temperature and pressure, this mixed vapor is condensed by a condenser and separated by a decanter or the like, and the polyhaloaromatic compound (a) removed by azeotropic distillation is returned to the reaction system. Here, the amount of water existing in the reaction system at the start of step 3 is 0.02 moles or less relative to 1 mole of the aprotic polar organic solvent the reaction system. If the amount of water exceeds this ratio, production of by-products, which inhibits polymerization in the reaction/polymerization step in step 3, occurs. From this point of view, specifically, the amount of water existing in the reaction system at the start of step 3 is preferably 0.02 moles or less relative to 1 mole of the aprotic polar organic solvent in the reaction system.

The above-mentioned aprotic polar organic solvents can be used as the aprotic polar organic solvent added in step 2. Among those solvents, NMP is particularly preferable.

Next, step 3 in the present invention is a step of conducting polymerization by allowing a polyhaloaromatic compound (a), an alkali metal hydrosulfide (b), and an alkali metal salt (c2) of a hydrolysate of the compound (c1) to react with each other in the slurry (I) obtained through the dehydration step of step 2 (refer to formula (3) below).

[Chem. 3]

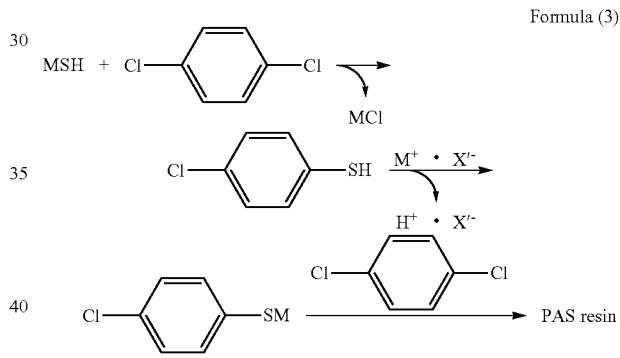

Formula (3)

(In the formula, M represents an alkali metal atom.)

The present invention is characterized by allowing a polyhaloaromatic compound (a), an alkali metal hydrosulfide (b), and an alkali metal salt (c2) of a hydrolysate of the compound (c1) to react with each other in the form of a slurry in the presence of a solid alkali metal sulfide and an aprotic polar organic solvent in a state where the amount of water in the reaction system is reduced as much as possible in this manner. In the present invention, by conducting a heterogeneous reaction in the reaction system using a sulfiding agent in a solid form in this manner, side reaction can be suppressed and a PAS resin having a higher molecular weight can be produced.

In the above reaction, the existing ratio of the organic acid alkali metal salt (c2) is preferably 0.01 moles or more and less than 0.9 moles, and particularly preferably 0.04 to 0.4 moles relative to 1 mole of sulfur atoms present in the reaction system from the standpoint that a significant effect of suppressing side reactions can be achieved.

The polyhaloaromatic compound (a) in the reaction of step 3 may be added in the reaction system in step 3. Alternatively, as described above, when the polyhaloaromatic compound (a) is used as the non-hydrolyzable organic solvent in step 1, the reaction of step 3 may be performed as it is.

Furthermore, the reaction of step 3 can be conducted using the alkali metal hydrosulfide that is present in the slurry (I) through step 3 without further treatment as the alkali metal hydrosulfide (b).

After the reaction of the polyhaloaromatic compound (a), the alkali metal hydrosulfide (b), and the alkali metal salt (c2) of a hydrolysate of the aliphatic cyclic compound (c1), as shown in formula (4) below, the hydrolysate of the aliphatic cyclic compound (c1), which has been involved in the reaction, produces the alkali metal hydrosulfide (b) again by an ion-exchange reaction with the solid alkali metal sulfide in the slurry, whereby the polymerization reaction represented by formula (3) can be allowed to proceed.

[Chem. 4]

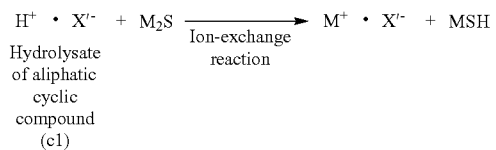

Formula (4)

$$H^+ \cdot X'^- + M_2S \xrightarrow{\text{Ion-exchange reaction}} M^+ \cdot X'^- + MSH$$

Hydrolysate of aliphatic cyclic compound (c1)

In this manner, in the reaction of step 3, the solid alkali metal sulfide is gradually converted into a required amount of the alkali metal hydrosulfide (b) and alkali metal salt (c2) of a hydrolysate of the compound (c1) through this cycle, and is supplied to the reaction system as a sulfiding agent. Therefore, the side reactions can be suppressed.

In step 3, a lithium salt compound may be added to the reaction system, and the reaction may be conducted in the presence of lithium ions.

Examples of the lithium salt compound that can be used herein include inorganic lithium salt compounds such as lithium fluoride, lithium chloride, lithium bromide, lithium iodide, lithium carbonate, lithium hydrogen carbonate, lithium sulfate, lithium hydrogen sulfate, lithium phosphate, lithium hydrogen phosphate, lithium dihydrogen phosphate, lithium nitrite, lithium sulfite, lithium chlorate, lithium chromate, lithium molybdate, lithium formate, lithium acetate, lithium oxalate, lithium malonate, lithium propionate, lithium butyrate, lithium isobutyrate, lithium maleate, lithium fumarate, lithium butanedioate, lithium valerianate, lithium hexanoate, lithium octanoate, lithium tartrate, lithium stearate, lithium oleate, lithium benzoate, lithium phthalate, lithium benzenesulfonate, lithium p-toluenesulfonate, lithium sulfide, lithium hydrosulfide, and lithium hydroxide; and organic lithium salt compounds such as lithium methoxide, lithium ethoxide, lithium propoxide, lithium isopropoxide, lithium butoxide, and lithium phenoxide. Among these compounds, lithium chloride and lithium acetate are preferable, and lithium chloride is particularly preferable. Furthermore, the lithium salt compounds can be used in the form of an anhydride, a hydrate, or an aqueous solution.

The amount of lithium ions in the reaction system in step 3 is preferably 0.01 moles or more and less than 0.9 moles, when the total number of moles of the hydrous alkali metal sulfide used in step 1 and the sulfiding agent added thereafter is 1 mole from the standpoint that the effect of improving reactivity in step 3 becomes significant. In particular, preferably, the existing ratio of the organic acid alkali metal salt (c) is 0.04 to 0.4 moles relative to 1 mole of sulfur atoms present in the reaction system, and the amount of lithium ions in the reaction system is in the range of 1.8 to 2.2 moles relative to the organic acid alkali metal salt (c) on a molar basis from the standpoint that the molecular weight of a polyarylene sulfide resin is further increased.

As described above, the alkali metal hydrosulfide (b), which is a raw material for the reaction and polymerization in step 3, is sequentially supplied to the reaction system by gradually converting the solid alkali metal sulfide in the slurry (I) into the alkali metal hydrosulfide (b). If necessary, the alkali metal hydrosulfide (b) may be separately added at any stage of step 3. Examples of the alkali metal hydrosulfide (b) that can be used herein include lithium hydrosulfide, sodium hydrosulfide, potassium hydroxide, rubidium hydrosulfide, cesium hydrosulfide, and hydrates thereof. Among these, lithium hydrosulfide and sodium hydrosulfide are preferable, and sodium hydrosulfide is particularly preferable.

A small amount of alkali metal hydroxide may be added so as to react with an alkali metal hydrosulfide (b) and an alkali metal thiosulfate that are present in small amounts in the alkali metal sulfide constituting the solid component of the slurry.

A specific method for conducting the reaction and polymerization in step 3 preferably includes adding, to the slurry (I) obtained through steps 1 and 2, as required, the polyhaloaromatic compound (a), the alkali metal hydrosulfide (b), an aprotic polar organic solvent, and the lithium salt compound; and conducting the reaction and polymerization at a temperature in the range of 180° C. to 300° C., preferably in the range of 200° C. to 280° C. The polymerization reaction can be conducted at a constant temperature, but it can also be conducted by raising the temperature stepwise or continuously.

Specifically, the amount of polyhaloaromatic compound (a) in step 3 is preferably in the range of 0.8 to 1.2 moles, and particularly preferably in the range of 0.9 to 1.1 moles per mole of sulfur atoms in the reaction system from the standpoint that a higher-molecular-weight PAS resin can be obtained.

In the reaction and polymerization reaction in step 3, an aprotic polar organic solvent may be further added. Although the total amount of aprotic polar organic solvent present in the reaction is not particularly limited, it is preferable to add the aprotic polar organic solvent in the range of 0.6 to 10 moles per mole of sulfur atoms present in the reaction system, and it is more preferable to add it in the range of 2 to 6 moles from the standpoint that a further increase in the molecular weight of a PAS resin can be achieved. In terms of an increase in the concentration of reactants per volume of a reaction vessel, the amount is preferably in the range of 1 to 3 moles per mole of sulfur atoms present in the reaction system.

Furthermore, in the reaction and polymerization in step 3, the amount of water in the reaction system becomes substantially anhydrous in the initial stage. In other words, the water used in hydrolysis of the aliphatic cyclic compound (c1) in the dehydration step of step 1 is released into the reaction system as a result of a ring closure reaction of the hydrolysate after the solid component in the slurry disappears. Accordingly, in step 3 of the present invention, the amount of water in the polymerization slurry at the time when a consumption rate of the solid alkali metal sulfide is 10% is preferably 0.2% by mass or less from the standpoint of increasing the molecular weight of the finally obtained PAS resin.

As for a device used in steps 1 to 3 described in detail above, first, an example of the dehydration device used in steps 1 and 2 is a dehydration vessel equipped with a stirrer, a distillation line, a condenser, a decanter, a distillate return line, an exhaust line, a hydrogen sulfide trapping unit, and a heater. The reaction vessel used for the dehydration treatments in steps 1 and 2 and the reaction and polymerization in step 3 is not particularly limited, but it is preferable to use a reaction vessel whose liquid contact portion is made of, for example, titanium, chromium, or zirconium.

A common polymerization method such as a batch system or continuous system can be applied to the respective steps of the dehydration treatments in steps 1 and 2 and the reaction and polymerization in step 3. It is preferable to carry out both dehydration step and polymerization step in an atmosphere of an inert gas. Examples of the inert gas that can be used include nitrogen, helium, neon, and argon. Among these, nitrogen is preferable in terms of economical efficiency and the ease of handling.

Examples of a post-treatment method of a reaction mixture containing a PAS resin obtained by the polymerization step include, but are not particularly limited to, (1) a method including subjecting, after the completion of a polymerization reaction, the reaction mixture to distillation for removing the solvent under reduced pressure or atmospheric pressure without further treatment or after the addition of an acid or a base, washing a solid matter after distilling off the solvent once, or twice or more times with a solvent such as water, acetone, methyl ethyl ketone, or an alcohol, and conducting neutralization of the solid matter, washing with water, filtration, and drying; (2) a method including adding, after the completion of a polymerization reaction, a solvent such as water, acetone, methyl ethyl ketone, an alcohol, an ether, a halogenated hydrocarbon, an aromatic hydrocarbon, or an aliphatic hydrocarbon (a solvent which is soluble in the solvent used for the polymerization and also a poor solvent at least to the PAS resin) to the reaction mixture as a precipitating agent to precipitate solid products such as a PAS resin and an inorganic salt, and conducting separation of the solid products by filtration, washing, and drying; and (3) a method including adding, after the completion of a polymerization reaction, a reaction solvent (or an organic solvent having solubility to a low-molecular-weight polymer equivalent to the reaction solvent) to the reaction mixture followed by stirring, filtering to remove a low-molecular-weight polymer, washing the residue once, or twice or more times with a solvent such as water, acetone, methyl ethyl ketone, or an alcohol, and conducting neutralization, washing with water, filtration, and drying.

In the post-treatment methods exemplified in (1) to (3) above, the drying of the PAS resin may be conducted under vacuum, or in air, or in an atmosphere of an inert gas such as nitrogen.

The PAS resin thus obtained can be used without further treatment for various molding materials or the like, or may be subjected to oxidative cross-linking by being subjected to a heat treatment in air, in oxygen-enriched air, or under reduced pressure. The temperature of this heat treatment varies depending on the target time of a cross-linking treatment and the atmosphere for the treatment, but is preferably in the range of 180° C. to 270° C. The heat treatment may be conducted using an extruder or the like at a temperature equal to or higher than the melting point of the PAS resin in a state where the PAS resin is melted. However, the heat treatment is preferably conducted at a temperature of the melting point plus 100° C. or lower because the possibility of thermal degradation of the PAS resin increases at higher temperatures.

The PAS resin obtained by the production method of the present invention described above in detail can be processed into moldings having good heat resistance, moldability, and dimensional stability by various melt processing methods such as injection molding, extrusion molding, compression molding, and blow molding.

It is also possible to use the PAS resin obtained by the present invention as a PAS resin composition by combining it with various fillers so as to further improve performances such as a strength, heat resistance, and dimensional stability. Examples of the filler include, but are not particularly limited to, fibrous fillers and inorganic fillers. Examples of the fibrous filler that can be used include fibers such as fiberglass, carbon fiber, silane glass fiber, ceramic fiber, aramid fiber, metal fiber, potassium titanate fiber, silicon carbide fiber, calcium sulfate fiber, and calcium silicate fiber; and natural fibers such as wollastonite. Examples of the inorganic filler that can be used include barium sulfate, calcium sulfate, clay, pyrophyllite, bentonite, sericite, zeolite, mica, isinglass, talc, attapulgite, ferrite, calcium silicate, calcium carbonate, magnesium carbonate, and glass beads. In the mold processing, additives such as releasing agents, colorants, heat stabilizers, UV stabilizers, foaming agents, rust-preventive agents, flame retarders, and lubricants can be added.

Furthermore, the PAS resin obtained by the present invention may be used as a PAS resin composition blended properly with synthetic resins such as polyester, polyamide, polyimide, polyetherimide, polycarbonate, polyphenylene ether, polysulfone, polyether sulfone, polyether ether ketone, polyether ketone, polyarylene, polyethylene, polypropylene, polytetrafluoroethylene, polydifluoroethylene, polystyrene, an ABS resin, an epoxy resin, a silicone resin, a phenolic resin, a urethane resin, and a liquid crystal polymer, or elastomers such as polyolefin rubber, fluorine rubber, and silicone rubber, according to the application.

Since the PAS resin obtained by the production method of the present invention has various functions that are originally possessed by the PAS resin, such as heat resistance and dimensional stability, the PAS resin is useful for a wide variety of applications, including electric/electronic components such as connecters, printed circuit boards, and sealing molded products; automobile parts such as lamp reflectors and electrical components; interior materials for buildings, aircraft, and automobiles; materials for various types of mold processing, namely, materials for injection molding or compression molding of precision components such as office automation (OA) equipment components, camera components, and watch components, materials for extrusion molding or pultrusion molding, such as composites, sheets, and pipes, and materials for fibers or films.

EXAMPLES

The present invention will now be described more specifically by way of Examples, but is not limited by only these Examples.

(Method for Measuring Melt Viscosity)

A melt viscosity ($\eta$) of each PPS resin prepared below is a value measured after holding the resin at 300° C., 1.96 MPa, and L/D=10 for 6 minutes, using a flow tester "CFT500D" manufactured by Shimadzu Corporation.

(Method for Measuring Amount of Residual NMP and Amount of Phenol Production)

The amount of NMP remaining in a slurry obtained in step 1 and the amount of phenol produced in a slurry obtained in step 3 are values measured using a gas chromatograph "GC2014" manufactured by Shimadzu Corporation and a column "G300" manufactured by Chemical Evaluation and Research Institute, Japan. The amount of phenol production is represented in units of % by mole relative to sulfur atoms present in an autoclave.

Example 1

Step 1

To a 150-L autoclave equipped with a stirring blade and connected to a pressure gauge, a thermometer, a condenser, a decanter, and a rectifying column, 33.222 kg (226 moles) of p-dichlorobenzene (hereinafter abbreviated to "p-DCB"), 2.280 kg (23 moles) of NMP, 27.300 kg (230 moles on a NaSH basis) of a 47.23 mass % aqueous NaSH solution, and 18.533 kg (228 moles on a NaOH basis) of a 49.21 mass % aqueous NaOH solution were charged. The temperature of the resulting reaction mixture was increased to 173° C. over a period of five hours in a nitrogen atmosphere while stirring, 27.300 kg of water was distilled, and the autoclave was then sealed. In this step, p-DCB distilled by azeotropy during dehydration was separated by the decanter, and returned to the autoclave as needed. A particulate anhydrous sodium sulfide composition was dispersed in p-DCB inside the autoclave after the completion of dehydration. The NMP content in this composition was 0.069 kg (0.7 moles). This result shows that 97% by mole (22.3 moles) of the charged NMP was hydrolyzed into a sodium salt of a ring-opening product of NMP (4-(methylamino) butyric acid) (hereinafter abbreviated to "SMAB"). The amount of SMAB in the autoclave was 0.097 moles per mole of sulfur atoms present in the autoclave. If all the charged NaSH and NaOH are changed to anhydrous $Na_2S$, the theoretical amount of dehydration is estimated to be 27.921 kg. Accordingly, the above result showed that, out of 621 g (34.5 moles) of water remaining in the autoclave, 401 g (22.3 moles) of water was consumed in the hydrolysis reaction between NMP and NaOH and was not present in the autoclave as water, and the residual 220 g (12.2 moles) of water remained in the autoclave in the form of water or crystal water. The amount of water in the autoclave was 0.053 moles per mole of sulfur atoms present in the autoclave.

Step 2

After the completion of the dehydration step, the inner temperature was cooled to 160° C., 47.492 kg (479 moles) of NMP was charged, and the temperature was increased to 185° C. The amount of water in the autoclave was 0.025 moles per mole of NMP charged in step 2. At the time when the gauge pressure reached 0.00 MPa, a valve connected to the rectifying column was opened, and the inner temperature was increased to 200° C. over a period of one hour. At this time, the temperature at an outlet of the rectifying column was controlled to be 110° C. or lower by cooling and adjusting the degree of opening of the valve. A mixed vapor of the distilled p-DCB and water was condensed by the condenser and separated by the decanter, and p-DCB was returned to the autoclave. The amount of distilled water was 179 g (9.9 moles).

Step 3

The amount of water in the autoclave at the start of step 3 was 41 g (2.3 moles). Specifically, the amount of water was 0.005 moles per mole of NMP charged in step 2, and 0.010 moles per mole of sulfur atoms present in the autoclave. The amount of SMAB in the autoclave was 0.097 moles per mole of sulfur atoms present in the autoclave as in step 1. Subsequently, the inner temperature was increased from 200° C. to 230° C. over a period of three hours, and stirring was conducted at 230° C. for three hours. The inner temperature was then increased to 250° C., and stirring was conducted for one hour. The gauge pressure at the time of an inner temperature of 200° C. was 0.03 MPa, and the final gauge pressure was 0.30 MPa. After cooling, a part, specifically 650 g, of the resulting slurry was poured into 3 L of water, and the mixture was stirred at 80° C. for one hour and was then filtered. This resulting cake was stirred again in 3 L of hot water, washed, and then filtered. This operation was repeated four times, and resulting product was filtered and dried at 120° C. for one night with a hot air dryer. Thus, 151 g of a PPS resin was obtained in the form of a white powder. This polymer had a melt viscosity of 274 Pa·s at 300° C., and the amount of phenol production was 0.06% by mole.

Example 2

Step 1

To a 150-L autoclave equipped with a stirring blade and connected to a pressure gauge, a thermometer, a condenser, a decanter, and a rectifying column, 33.222 kg (226 moles) of p-DCB, 4.560 kg (46 moles) of NMP, 27.300 kg (230 moles on a NaSH basis) of a 47.23 mass % aqueous NaSH solution, and 18.533 kg (228 moles on a NaOH basis) of a 49.21 mass % aqueous NaOH solution were charged. The temperature of the resulting reaction mixture was increased to 173° C. over a period of five hours in a nitrogen atmosphere while stirring, 26.794 kg of water was distilled, and the autoclave was then sealed. In this step, p-DCB distilled by azeotropy during dehydration was separated by the decanter, and returned to the autoclave as needed. A particulate anhydrous sodium sulfide composition was dispersed in p-DCB inside the autoclave after the completion of dehydration. The NMP content in this composition was 0.089 kg (0.9 moles). This result shows that 98% (45.1 moles) of the charged NMP was hydrolyzed into SMAB. The amount of SMAB in the autoclave was 0.196 moles per mole of sulfur atoms present in the autoclave. If all the charged NaSH and NaOH are changed to anhydrous $Na_2S$, the theoretical amount of dehydration is estimated to be 27.921 kg. Accordingly, the above result showed that, out of 1,127 g (62.6 moles) of water remaining in the autoclave, 812 g (45.1 moles) of water was consumed in the hydrolysis reaction between NMP and NaOH and was not present in the autoclave as water, and the residual 315 g (17.5 moles) of water remained in the autoclave in the form of water or crystal water. The amount of water in the autoclave was 0.076 moles per mole of sulfur atoms present in the autoclave.

Step 2

After the completion of the dehydration step, the inner temperature was cooled to 160° C., 70.098 kg (707 moles) of NMP was charged, and the temperature was increased to 185° C. The amount of water in the autoclave was 0.025 moles per mole of NMP charged in step 2. At the time when the gauge pressure reached 0.00 MPa, a valve connected to the rectifying column was opened, and the inner temperature was increased to 200° C. over a period of one hour. At this time, the temperature at an outlet of the rectifying column was controlled to be 110° C. or lower by cooling and adjusting the degree of opening of the valve. A mixed vapor of the distilled p-DCB and water was condensed by the condenser and separated by the decanter, and p-DCB was returned to the autoclave. The amount of distilled water was 273 g (15.2 moles).

Step 3

The amount of water in the autoclave at the start of step 3 was 42 g (2.3 moles). Specifically, the amount of water was 0.003 moles per mole of NMP charged in step 2, and 0.010 moles per mole of sulfur atoms present in the autoclave. The amount of SMAB in the autoclave was 0.196 moles per mole of sulfur atoms present in the autoclave as in step 1. Subsequently, the inner temperature was increased from 200° C. to 230° C. over a period of three hours, and stirring was conducted at 230° C. for three hours. The inner temperature was then increased to 250° C., and stirring was conducted for one hour. The gauge pressure at the time of an inner temperature of 200° C. was 0.02 MPa, and the final gauge pressure was 0.28 MPa. After cooling, a part, specifically 650 g, of the resulting slurry was poured into 3 L of water, and the mixture was stirred at 80° C. for one hour and was then filtered. This resulting cake was stirred again in 3 L of hot water, washed, and then filtered. This operation was repeated four times, and resulting product was filtered and dried at 120° C. for one night with a hot air dryer. Thus, 151 g of a PPS resin was obtained in the form of a white powder. This polymer had a melt viscosity of 315 Pa·s at 300° C., and the amount of phenol production was 0.05% by mole.

Comparative Example 1

The operation was carried out in the same manner as in Example 1 except that the treatment for removing residual crystal water was not performed in step 2. The amount of water in the autoclave at the start of step 3 was 220 g (12.2 moles). Specifically, the amount of water was 0.025 moles per mole of NMP charged in step 2, and 0.053 moles per mole of sulfur atoms present in the autoclave. The amount of SMAB in the autoclave was 0.097 moles per mole of sulfur atoms present in the autoclave as in step 1 of Example 1. The gauge pressure at the time of an inner temperature of 200° C. was 0.05 MPa, and the final gauge pressure was 0.39 MPa. Through this operation, 150 g of a PPS resin was obtained in the form of a white powder. This polymer had a melt viscosity of 85 Pa·s at 300° C., and the amount of phenol production was 0.57% by mole.

Comparative Example 2

The same dehydration operation was carried out as in Example 1 except that NMP was not charged in step 1. The amount of distilled water after dehydration was 27.673 kg. This result showed that 248 g (13.8 moles) of water remaining in the autoclave remained in the autoclave in the form of water or crystal water. The amount of water in the autoclave was 0.060 moles per mole of sulfur atoms present in the autoclave. Next, the same operation was carried out as in Example 1 except that the treatment for removing residual crystal water was not performed in step 2, 414 g (23.0 moles) of water was added in addition to NMP, and step 3 was performed without conducting the dehydration operation. The amount of SMAB in the autoclave at the start of step 3 was zero. The amount of water present in the autoclave was 0.077 moles per mole of NMP charged in step 2, and 0.160 moles per mole of sulfur atoms. The gauge pressure at the time of an inner temperature of 200° C. was 0.10 MPa, and the final gauge pressure was 0.40 MPa. Through this operation, 150 g of a PPS resin was obtained in the form of a white powder. This polymer had a melt viscosity of 48 Pa·s at 300° C., and the amount of phenol production was 1.09% by mole.

The melt viscosities of the PPS resins and the amounts of phenol production in Examples 1 and 2 and Comparative Examples 1 and 2 are summarized in Table 1.

TABLE 1

| | Example 1 | Example 2 | Comparative Example 1 | Comparative Example 2 |
|---|---|---|---|---|
| Melt viscosity (Pa · s) | 274 | 315 | 85 | 48 |
| Amount of phenol production (mol %) | 0.06 | 0.05 | 0.57 | 1.09 |

The comparisons of the melt viscosity and the amount of phenol production between the PPS resins obtained in Examples 1 and 2 and the PPS resins obtained in Comparative Examples 1 and 2 showed the following.

The PPS resins obtained in Examples 1 and 2 had a very high melt viscosity of 274 to 315 Pa·s, showing that the PPS resins had a high molecular weight. In contrast, the PPS resin obtained in Comparative Example 1 and 2 had a low melt viscosity of 48 to 85 Pa·s, showing that the PPS resin did not have a high molecular weight.

Furthermore, in the PPS resins obtained in Examples 1 and 2, the amount of phenol production was very low; 0.05% to 0.06% by mole, showing that a phenol-producing propagating-end termination reaction could be sufficiently suppressed. In contrast, in the PPS resins obtained in Comparative Examples 1 and 2, the amount of phenol production was high; 0.57% to 1.09% by mole, showing that the phenol-producing propagating-end termination reaction could not be sufficiently suppressed.

The invention claimed is:

1. A method for producing a polyarylene sulfide resin, comprising, as essential production steps,
   step 1:
     a step of producing a slurry (I) containing a solid alkali metal sulfide by allowing a hydrous alkali metal sulfide,
     or
     a hydrous alkali metal hydrosulfide and an alkali metal hydroxide, and
     an aliphatic cyclic compound (c1) that can be ring-opened by hydrolysis to react with each other while conducting dehydration in the presence of a non-hydrolyzable organic solvent;
   step 2: a step of further adding an aprotic polar organic solvent after the production of the slurry (I), and distilling off water to conduct dehydration; and
   step 3: a step of conducting polymerization by allowing a polyhaloaromatic compound (a), an alkali metal hydrosulfide (b), and an alkali metal salt (c2) of a hydrolysate of the compound (c1) to react with each other in the slurry (I) obtained through the dehydration step of the step 2 in a state where the amount of water existing in the reaction system is 0.02 moles or less relative to 1 mole of the aprotic polar organic solvent.

2. The method for producing a polyarylene sulfide resin according to claim 1, wherein the non-hydrolyzable organic solvent is the polyhaloaromatic compound (a).

3. The method for producing a polyarylene sulfide resin according to claim 1, wherein the aprotic polar organic solvent added in the step 2 is the aliphatic cyclic compound (c1) that can be ring-opened by hydrolysis.

4. The method for producing a polyarylene sulfide resin according to claim 1, wherein, in the step 1, the aliphatic cyclic compound (c1) is used in a ratio of 0.01 moles or more and less than 0.9 moles relative to 1 mole of the hydrous alkali metal sulfide or the hydrous alkali metal hydrosulfide.

5. The method for producing a polyarylene sulfide resin according to claim 1, wherein, in the step 2, the amount of aprotic polar organic solvent added in the reaction system is in a ratio of 0.5 to 5 moles relative to 1 mole of sulfur atoms present in the reaction system.

6. The method for producing a polyarylene sulfide resin according to claim 1, wherein the content of the solid alkali metal sulfide in the slurry obtained in the step 1 is 0.1 to 0.99 moles per mole of the hydrous alkali metal sulfide used in the step 1.

* * * * *